United States Patent
Dong et al.

(10) Patent No.: US 8,269,379 B2
(45) Date of Patent: Sep. 18, 2012

(54) LINEAR VIBRATOR

(75) Inventors: Le-Ping Dong, Shenzhen (CN); Hong-Fu Xu, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 301 days.

(21) Appl. No.: 12/774,925

(22) Filed: May 6, 2010

(65) Prior Publication Data

US 2011/0115311 A1 May 19, 2011

(30) Foreign Application Priority Data

Nov. 16, 2009 (CN) .................... 2009 2 0260393 U

(51) Int. Cl.
*H02K 33/00* (2006.01)

(52) U.S. Cl. ........................................ 310/25; 310/28

(58) Field of Classification Search .................. 310/15, 310/17, 20, 25–30, 81; 381/396, 400, 401, 381/404, 406, 412; 340/388.1
See application file for complete search history.

(56) References Cited

U.S. PATENT DOCUMENTS

| 3,312,841 | A  | * | 4/1967  | Shinobu Makino | 310/15 |
| 7,550,880 | B1 | * | 6/2009  | Pusl           | 310/15 |
| 2008/0306332 | A1 | * | 12/2008 | Choi et al.    | 600/38 |
| 2009/0096299 | A1 | * | 4/2009  | Ota et al.     | 310/25 |
| 2011/0089772 | A1 | * | 4/2011  | Dong et al.    | 310/25 |

\* cited by examiner

*Primary Examiner* — Tran Nguyen
(74) *Attorney, Agent, or Firm* — IPro, Inc.; Na Xu

(57) ABSTRACT

A linear vibrator is disclosed. The linear vibrator includes a housing having a base and a cover, a number of elastic members connected to the housing, a moving unit suspended inside the housing by the elastic members, a PCB covered by the housing and a coil mounted on the PCB. The base has a bottom wall, a plurality of sidewalls extending vertically from the bottom wall and a blocking ring extending form a central portion of the bottom wall. The moving unit has a magnet assembly and at least a pair of patches and vibrates along a direction parallel to the bottom wall, the coil is located right below the magnet assembly.

14 Claims, 3 Drawing Sheets

LINEAR VIBRATOR

FIELD OF THE INVENTION

The present invention generally relates to the art of vibrators and, more particularly, to a linear vibrator for generating tactile sensation.

DESCRIPTION OF RELATED ARTS

Consumer products, such as mobile phones and portable multi-media players, generally include vibrators for generating tactile feedback. For example, a mobile phone has a vibrator for generating vibration while a call is called in, and a portable multi-media player has a touch screen having vibrators for getting tactile feedback.

A vibrator has a moving unit moving along a linear direction is called linear vibrator. Linear vibrators are widely used in consumer products and are disclosed in U.S. Pat. No. 6,466,682 B2 issued on Oct. 15, 2002, and U.S. Pat. No. 7,099,489 B2 issued on Aug. 29, 2006. The vibrator is mounted on a mounting surface of a printed circuit board, and the moving unit thereof is actuated to move along a direction perpendicular to the mounting surface. However, the movement along the direction perpendicular to the mounting surface increases the height of the vibrator.

So, it is necessary to provide a new vibrator for solving the problem mentioned above.

SUMMARY OF THE INVENTION

In one embodiment of the present invention, a linear vibrator is disclosed. The linear vibrator includes a housing having a base and a cover, a number of elastic members connected to the housing, a moving unit suspended inside the housing by the elastic members, a PCB (Printed Circuit Board) covered by the housing, and a coil mounted on the PCB. The base has a bottom wall, a plurality of sidewalls extending vertically from the bottom wall, and a blocking ring extending form a central portion of the bottom wall. The moving unit has a magnet assembly and at least a pair of patches. The moving unit vibrates along a direction parallel to the bottom wall. The patches may contact the blocking ring during the vibration of the moving unit.

Other features and advantages of the present invention will become more apparent to those skilled in the art upon examination of the following drawings and detailed description of an exemplary embodiment.

DETAILED DESCRIPTION OF THE EXEMPLARY EMBODIMENT

Reference will now be made to describe the exemplary embodiment of the present invention in detail.

Figure 1:
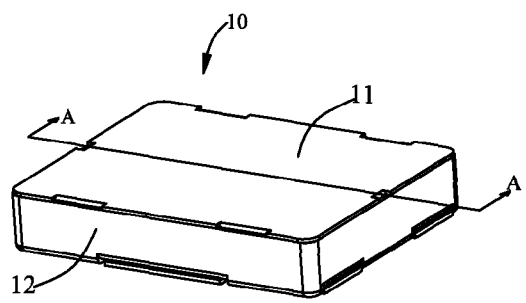
FIG. 1 is an isometric view of a linear vibrator in accordance with an exemplary embodiment of the present invention.
Figure 2:
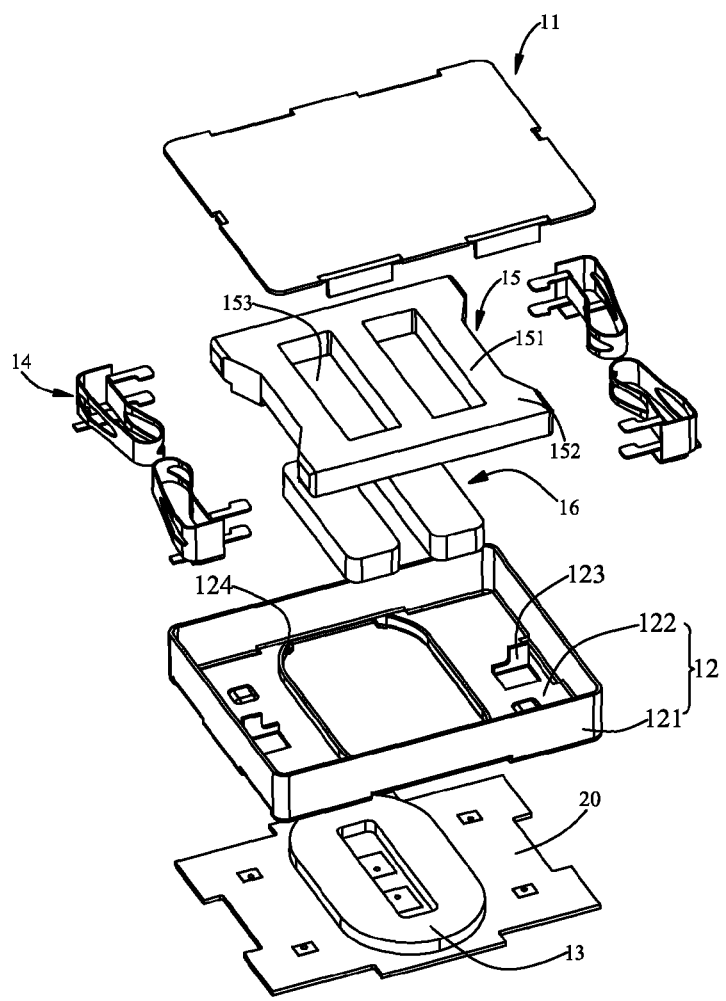
FIG. 2 is an exploded view of the linear vibrator in FIG. 1.
Figure 3:
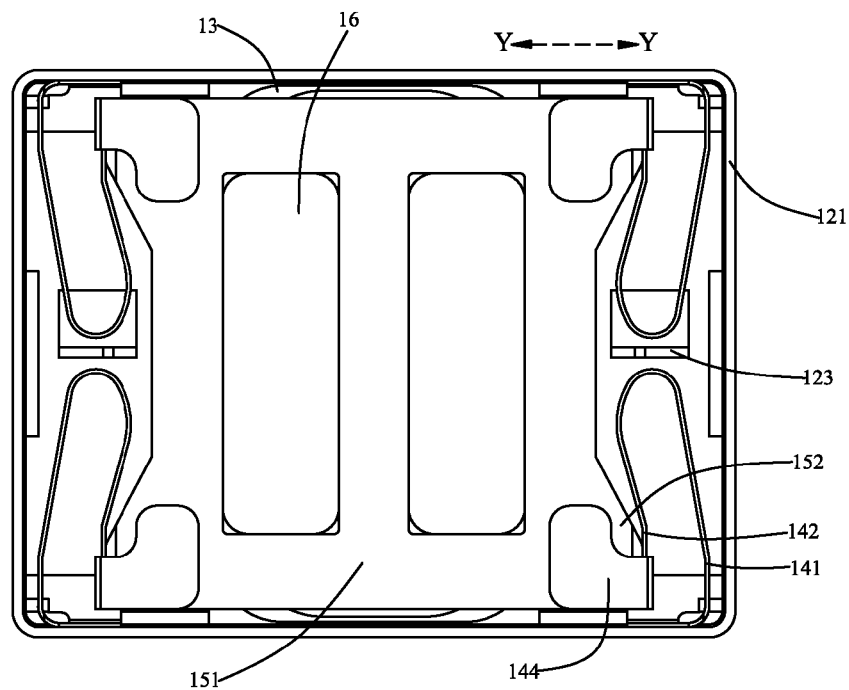
FIG. 3 is top view of the linear vibrator, a cover thereof being removed away.

A linear vibrator is mounted on a printed circuit board for generating tactile vibration. Referring to FIGS. 1-3, a linear vibrator 10, in accordance with an exemplary embodiment of the present invention, includes a cover 11, a base 12 forming a receiving space together with the cover 11, a PCB 20 covered by the base 12, an annular coil 13, a plurality of elastic member 14, a weight 15, and a magnet assembly 16. The cover 11 and the base 12 corporately form a housing having the receiving space. The base 12 further defines a bottom wall 122 and a plurality of sidewalls 121 extending vertically from the bottom wall 122. The PCB 20 is at least partially covered by the bottom wall 122. While assembled, the coil 13 is located right below the magnet assembly 16. The combination of the weight 15 and the magnet assembly 16 is served as a moving unit. When electrified, the moving unit vibrates along a direction paralleled to the PCB 20.

The elastic members 14 are positioned on the base 12, preferably on the sidewalls 121 of the base 12. The weight 15 is suspended in the receiving space by the elastic members 14. The weight 15 includes a main body 151 and a plurality of positioning portions 152 extending from the main body 151. The positioning portions 152 are used for assembling with the elastic members 14. The main body 151 defines a through hole 153 in a middle portion thereof for receiving the magnet assembly 16 therein. Thus, the magnet assembly 16, together with the weight 15, is suspended in the receiving space by the elastic members 14, i.e., the moving unit is suspended in the receiving space. In fact, the magnet assembly 16 may solely be a moving unit without the weight 15, and can be directly connected to the elastic members 14. In addition, if the weight 15 is used as a part of the moving unit, the weight 15 can be made from materials having densities higher than 7.8 g/cm3.

Figure 4:
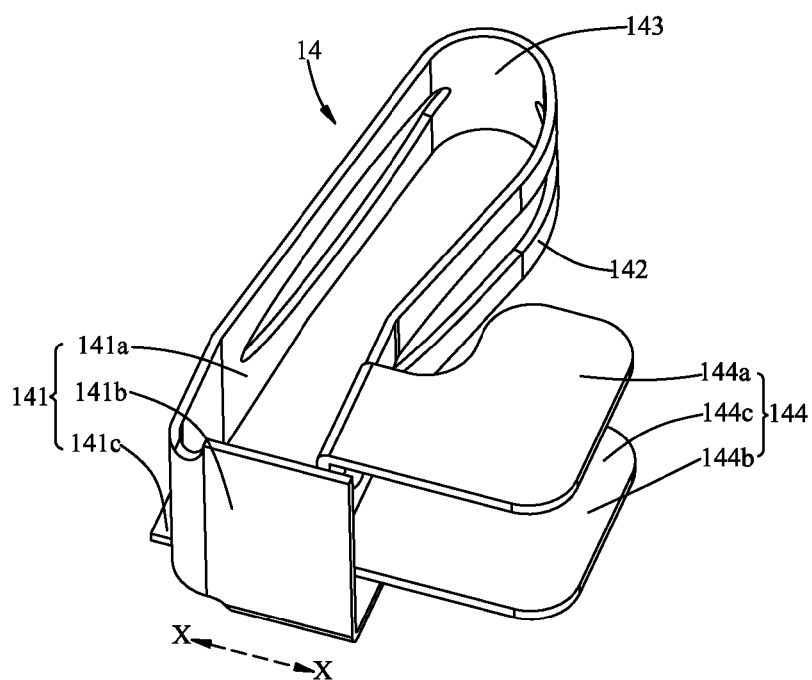
FIG. 4 is an isometric view of an elastic member of the linear vibrator.
Figure 5:
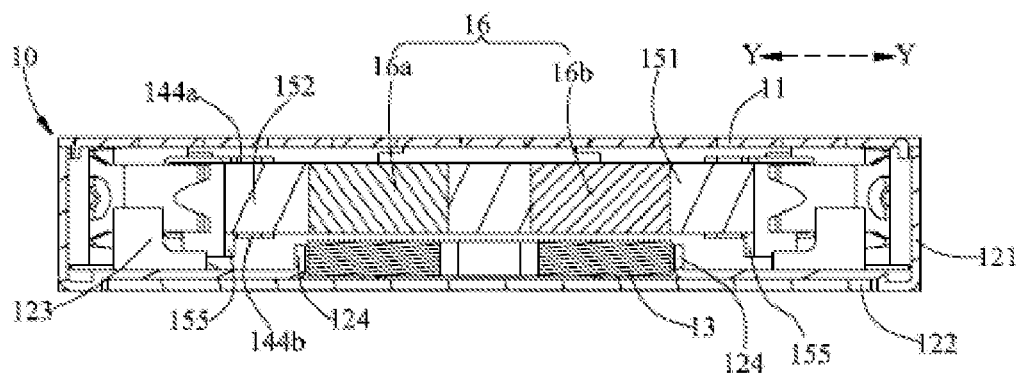
FIG. 5 is a cross-sectional view of the linear vibrator along a line A-A in FIG. 1.

Referring to FIGS. 4-5, together with FIGS. 1-3, each of the elastic members 14 includes a fastening portion 141 fixed on the sidewall 121, an elastic arm 142 substantially parallel to the fastening portion 141, and a mounting portion 144 extending from the elastic arm 142. The fastening portion 141 is connected to the elastic arm by a U-shaped connecting portion 143. Preferably, the fastening portion 141 may include a first fastening part 141a, a second fastening part 141b substantially perpendicularly to the first fastening part 141a, and a third fastening part 141c extending vertically from the second fastening part 141b and parallel to the bottom wall 122, by which the fastening portion 141 can be positioned on two adjacent sidewalls 121 of the base 12. The mounting portion 144 extends vertically from the elastic arm and extends far away from the fastening portion 141. Further, preferably, the mounting portion 144 may include an upper part 144a, a lower part 144b opposed from the upper part 144b, and a slot 144c between the upper part 144a and the lower part 144b. Accordingly, the elastic arm 142 can deform elastically along a direction X-X substantially perpendicularly to the first fastening part 141a, as shown in FIG. 4. The positioning portion 152 of the weight 15 is at least partially received in the slot 144c of the mounting portion 144 of the elastic member 14, i.e., the positioning portion 152 is sandwiched between the upper part 144a and the lower part 144b. Therefore, the weight 15 is suspended in the receiving space by the elastic members 14.

Figure 6:
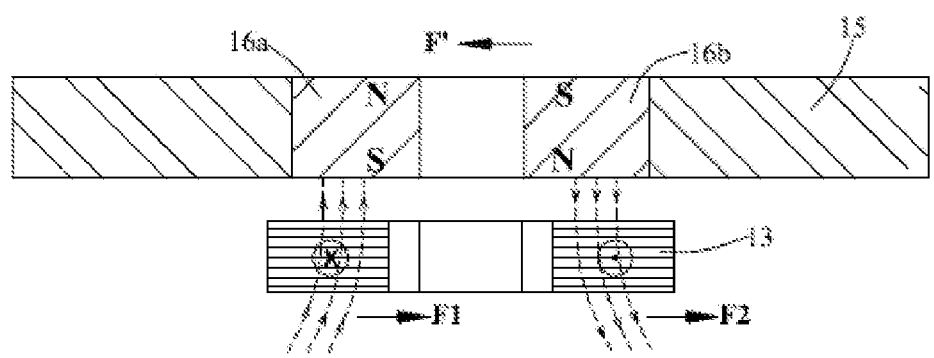
FIG. 6 is a schematic illustration showing how the vibrator woks.

The magnet assembly 16 has a first magnet part 16a and a second magnet part 16b, wherein, the first magnet part 16a has magnetic poles opposite to those of the second magnet part 16b, as shown in FIG. 6. Planes of magnetic poles of the magnet assembly 16 are parallel and face to the bottom wall 122 and are also parallel to the coil 13. The coil 13 receives current from external circuit. Referring to FIG. 6, at one moment, direction of the current passing through the left half of the coil is inward into the paper (labeled as ⊗), and direction of the current passing through the right half of the coil is outward (labeled as ⊙). Magnetic lines of force are shown as dashed lines with arrows. According to Left-hand rule, direction of the electromagnetic force F1 applied on the left half coil is rightward, and direction of the electromagnetic force F2 applied on the right half coil is also rightward. Thus, the whole coil 13 is given a rightward total electromagnetic force which forces the coil 13 to move rightward. However, the coil 13 is positioned on the PCB 20 and can not be driven to move. As a result, the weight 15 suspended by the elastic members 14 is forced to move leftward by the reaction force F'. As direction and intensity of the current passing through the coil 13 is varied, the movement of the weight 15 is leftward or rightward, alternatively, which is called vibration. Direction of the vibration is parallel to the bottom wall 122 (shown as direction Y-Y in FIG. 5).

As the direction of vibration is parallel to the bottom wall, a height of the linear vibrator can be reduced.

During vibration, the elastic members 14 is constantly and alternatively compressed and stretched. If the vibration amplitude exceeds the maximum elastic deformation of the elastic members 14, the elastic members 14 may be damaged. Referring FIGS. 2, 3, and 5, the base 12 defines a pair blocking masses 123, a connecting line there between being parallel to the vibrating direction of the moving unit. In addition, during the vibration of the moving unit, the blocking masses 123 can withstand the moving unit for limiting the vibration amplitude. While the moving unit is still, a distance between one of the blocking masses 123 and the part contacting the blocking mass 123 of the moving unit is smaller than the effective elastic displacement of the elastic member 14. so-called effective elastic displacement is defined as a maximum elastic deformation of the elastic arm 142 along the vibrating direction of the moving unit.

Preferably, the base 12 further defines a blocking ring 124 extending form a central portion of the bottom wall 122, the blocking ring 124 forming an accommodating space (not labeled). While assembled, the coil 13 is partially received in the accommodating space. The blocking ring 124 is also located in the vibrating scope of the moving unit. According to the blocking ring 124, the moving unit defines at least a pair of patches 155. During the vibration of the moving unit, the patches 155 can withstand the moving unit by contacting the blocking ring 124 for limiting the vibration amplitude, together with the blocking masses 123. Again, when the moving unit is still, a distance between the one of the patch and a part contacting the blocking piece of the blocking ring 124 is smaller than the effective elastic displacement of the elastic member 14.

As the vibrating direction is parallel to the PCB 20, a height of the vibrator is accordingly reduced. And the elastic members 14 are effectively protected from plastic deformation by the blocking ring 124, and the patches 155.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A linear vibrator, comprising:
  a cover;
  a base forming a housing together with the cover, the base defining a bottom wall, a plurality of sidewalls extending vertically from the bottom wall, and a blocking ring extending form a central portion of the bottom wall;
  a plurality of elastic members received in the housing, each of the elastic members including a fastening portion connecting to the housing, an elastic arm extending from the fastening portion, and a mounting portion extending from the elastic arm, the elastic arm being deformable parallel to the bottom wall;
  a weight suspended in the housing by the elastic members and defining a through hole therein, the weight further defining at least a pair of patches;
  a magnet assembly accommodated in the through hole of the weight, a half part of the magnet assembly having magnetic poles opposite to those of the other half, and planes of magnetic poles of the magnet assembly being parallel and facing to the bottom wall of the base; and
  a printed circuit board covered by the housing for carrying a coil thereon, the coil being located below the magnet assembly, wherein
  the blocking ring is located on the vibration path during vibration of the combination of the weight and the magnet assembly for being capable of withstanding the patches for protecting the elastic members from plastic deformation.

2. The linear vibrator as described in claim 1, wherein the fastening portion of the elastic member includes a first fastening part connecting to one sidewall of the base and a second fastening part connecting to another adjacent sidewall.

3. The linear vibrator as described in claim 2, wherein the fastening portion of the elastic member further includes a third fastening part extending vertically from the second fastening part and paralleling to mounted on the bottom wall.

4. The linear vibrator as described in claim 1, wherein the mounting portion of the elastic member includes an upper part, a lower part opposed from the upper part, and a slot between the upper part and the lower part.

5. The linear vibrator as described in claim 4, wherein the weight defines a positioning portion at least partially received in the slot and sandwiched between the upper part and the lower part.

6. The linear vibrator as described in claim 1, wherein the weight is made from materials having densities higher than 7.8 g/cm3.

7. The linear vibrator as described in claim 1, wherein the magnet assembly has a first magnet part and a second magnet part separately positioned in a through hole of the weight.

8. A linear vibrator, comprising:
  a housing including a cover and a base, the base defining a bottom wall, a plurality of sidewalls vertically extending from the bottom wall, and a blocking ring extending form a central portion of the bottom wall;
  a plurality of elastic members connected to the housing, each of the elastic members including an elastic arm being deformable parallel to the bottom wall;
  a moving unit suspended by the elastic members, the moving unit comprising a magnet assembly and at least a pair of patches, one half of the magnet assembly having magnetic poles opposite to those of the other half, and planes of magnetic poles of the magnet assembly being parallel and facing to the bottom wall of the base; and
  a printed circuit board covered by the housing and a coil mounted on the PCB, the coil located below the magnet assembly, wherein the blocking ring is located on the vibration path during vibration of the moving unit for being capable of withstanding the patches for protecting the elastic members from plastic deformation.

9. The linear vibrator as described in claim 8, wherein the elastic member further including a fastening portion having a first fastening part connecting to one sidewall of the base and a second fastening part connecting to another adjacent sidewall.

10. The linear vibrator as described in claim 9, wherein the elastic member further defines a mounting portion extending from the elastic arm, the mounting portion including an upper part, a lower part opposed from the upper part, and a slot between the upper part and the lower part.

11. The linear vibrator as described in claim 10, wherein the moving unit defines a positioning portion at least partially received in the slot and sandwiched between the upper part and the lower part.

12. The linear vibrator as described in claim 8, wherein the moving unit further comprises a weight accommodating the magnet assembly, the weight being made from materials having densities higher than 7.8 g/cm3.

13. A linear vibrator, comprising:
a housing including a base and a cover, the base having a bottom wall, a plurality of sidewalls extending vertically from the bottom wall, and a blocking ring extending form a central portion of the bottom wall;
a plurality of elastic members connected to the housing;
a moving unit suspended in the housing by the elastic members, the moving unit having a magnet assembly and at least a pair of patches, the moving unit vibrating along a direction parallel to the bottom wall;
a printed circuit board covered by the housing and a coil mounted on the PCB, the coil located below the magnet assembly, wherein
the blocking ring is located on the vibration path during vibration of the moving unit for being capable of withstanding the patches for protecting the elastic members from plastic deformation.

14. The linear vibrator as described in claim 13, wherein the moving unit further comprises a weight surrounding the magnet assembly, the weight being made from materials having densities higher than 7.8 g/cm3.

* * * * *